Aug. 25, 1931.   H. BACH   1,820,644
COUPLING DEVICE
Filed Aug. 26, 1929
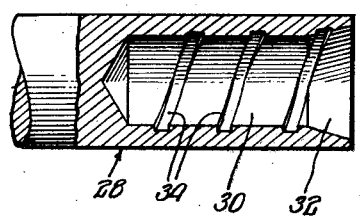
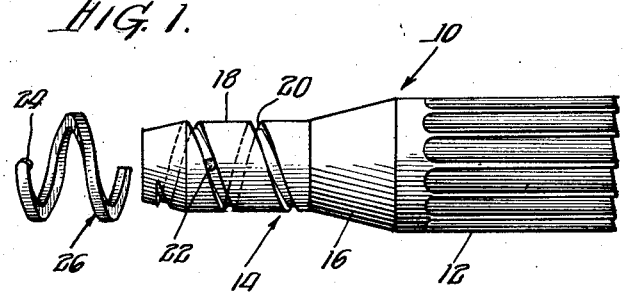
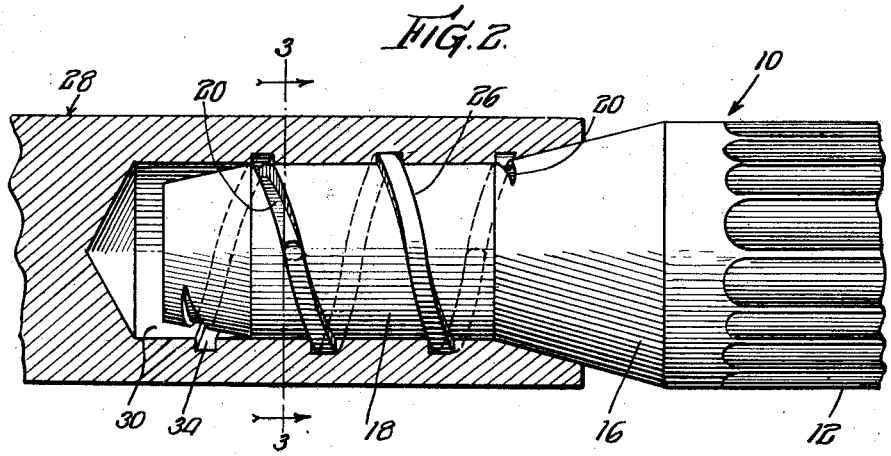
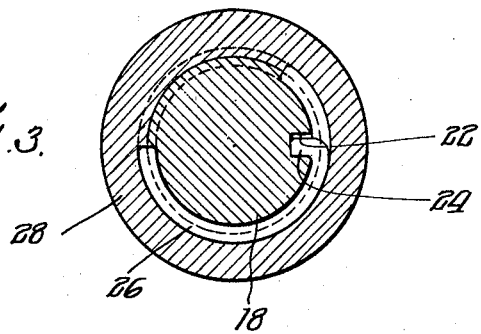
INVENTOR:
HARALD BACH
By Cheever, Cox & Moore
ATTYS.

Patented Aug. 25, 1931

1,820,644

UNITED STATES PATENT OFFICE

HARALD BACH, OF OAK PARK, ILLINOIS

COUPLING DEVICE

Application filed August 26, 1929. Serial No. 388,318.

My invention relates generally to coupling devices and more particularly to means for coupling the stems or shanks of rotary tools such as end mills, reamers and cutters of like nature with a supporting socket.

Numerous inconveniences and disadvantages have been experienced in using conventional types of tool coupling devices. Thus, for example, after the usual tapered shank of a tool such as the shank of an end mill, drill or the like has been fitted within a companion tapered socket, it is often very difficult to uncouple these elements as the result of the binding action between the tapered surfaces. In attempting to disconnect these parts it frequently happens that they are subjected to distorting strains and stresses in the hands of a machinist. Tool shanks and sockets have heretofore been provided in some instances with standard threads for the purpose of uniting the parts and this arrangement has also presented certain disadvantages. In the first place it requires the expenditure of considerable time and effort to screw and unscrew the parts and in the second place it has not been practical to employ a tapered shank section in combination with a threaded section because of the inability to satisfactorily regrind said tapered section without interfering with the threads. The aforesaid threaded connection also fails to insure the positive alignment of the tool in the socket, particularly after the device has been used for any appreciable period.

It is one of the primary objects of my present invention to avoid the above mentioned and other inconveniences and disadvantages which have heretofore been experienced in coupling tool elements and my invention is not limited to means for coupling tool shanks with sockets but is capable of many other practical applications.

It might be stated that my invention contemplates the provision of an arrangement whereby an apertured member and an insertable shank or stem may be quickly united with a minimum amount of effort and skill on the part of the user and to this end I propose to provide in said parts companion helical ways or grooves having a relatively long lead, and a detachable means cooperating with said companion grooves to effect the quick screwing and unscrewing of the parts.

In addition to providing means for quickly and easily coupling the above mentioned parts, it is also an object of my present invention to insure the proper alignment or centering of a stem within a socket when these parts occupy their final position of assembly and one way to accomplish this is to provide in addition to the above mentioned stem portion having the spiral way, a tapered portion which cooperates with a companion tapered portion in the socket.

A still further object of my present invention is to provide a tapered tool shank adapted for threaded engagement with a socket, in which the threaded surface of the shank may be ground whenever desired without experiencing any obstruction or interference from threads and to this end I propose to provide a detachable thread element which may be removed when the tool shank or stem is to be ground.

These and numerous other objects and advantages will be more apparent when considered in connection with the accompanying drawings wherein:

Figure 1 is an exploded view disclosing the elements which comprise a tool coupling device representing one embodiment of my invention, the tool socket being shown in section in order to more clearly illustrate the structural characteristics thereof;

Figure 2 is an enlarged fragmentary elevational view with the socket portion shown in section, said view disclosing the position of the parts when assembled; and Figure 3 is a transverse sectional view taken substantially along the line 3—3 of Figure 2.

Referring now to the drawings more in detail wherein like numerals have been employed to designate similar parts throughout the various figures, it will be seen that one embodiment of my invention comprises a tool member designated generally by the numeral 10 which includes a tool or cutter portion 12 and a shank or stem portion 14. This shank 14 includes a tapered section 16 and a cylindrical section 18. This section 18 is provided with a helical way or groove 20 having a relatively long lead. An aperture or notch 22 provided in the bottom of the helical way 20 is adapted to receive a locking pin or lug 24 provided at the extremity of a helical member of locking element 26.

This helical element 26 corresponds in width to the width of the spiral way 20 and is capable of being screwed upon the shank section 18 within said way or groove so as to occupy the position shown in Figure 2. The helical member 26 may be constructed of hardened spring steel or other suitable material and I prefer to have the member 26 of such a size as to yieldingly bear against the bottom of the groove 20 and thereby insure the positive locking engagement of the lug 24 within the notch 22. Obviously, by the insertion of a suitable prying tool, the lug 24 of the helical element 26 may be dislodged from the aperture 22 to effect the convenient unscrewing of the element from the tool shank. It will be noted that when the helical member 26 is operatively associated within the spiral groove of the shank 14, substantially one-half of the helical spring stock will project beyond the periphery of the tool section 18 so as to present a thread portion which may be screwed into a socket or apertured member designated generally by the numeral 28.

This socket 28 is formed with an aperture 30 for receiving the shank section 18 and a tapered section 32 which provides an abutment for the tapered section 16 of the shank. A spiral groove or way 34 provided within the socket 28 presents a complementary or companion groove for cooperation with the groove 20 provided in the shank. This complementary groove 34 is designed to receive the projecting portion of the helical element 26 carried by the shank as clearly shown in Figure 2.

By having the pitch or lead of the helical ways relatively long, I am able to couple or uncouple the shank and socket by imparting slight rotation to either of the parts. This is to be distinguished from methods which have heretofore been employed in coupling members together by the use of standard screw threads. In such instances it is necessary to impart a large number of turns to either the socket or the tool in order to uncouple the parts. The tapered sections 16 and 32 cooperate to not only positively align the tool with respect to the socket but also provide a binding action which cooperates with the binding action of the long lead thread construction in rigidly securing the tool in position. The tapered surface of each part is relatively short when compared with the long taper on shanks which have heretofore been extensively employed and by using my improved construction the taper of the shank and socket may be considerably increased. This increase in taper obviously decreases the tendency for the parts to bind, and any decrease in binding effectiveness over the conventional long taper constructions is compensated for by the binding action of the long lead thread arrangement. The fact that I am able to grind the tool shank as well as the internal surface of the apertured member or socket without destroying or in any way impairing the thread structure presents a very practical construction. In other words, I am able to grind these surfaces so as to insure perfect alignment of the parts when connected without encountering any interference from screw threads. If the conventional type of standard threads were cut in the shank section 18, obviously considerable difficulty would be experienced in attempting to grind the tapered section 16. In other words, the threads would interfere with the free travel of the grinding wheel longitudinally of the tool shank. By employing my detachable thread element 26, the above difficulty is completely obviated. When it is found necessary to grind the surface of the shank or the internal surface of the socket, it is only necessary to disengage the helical element. The peripheral surface of the shank or socket is then free to be ground without the potential hazard of disfiguring or interfering with threads. In the particular embodiment of the invention which I have disclosed, the thread element 26 is attachable to the shank of the tool. Obviously, this thread element could be similarly retained within the companion way 34 provided in the socket without departing from the spirit of the invention. It should also be understood that means might be provided for securing the thread element in place, other than the described lug and notch arrangement.

It should also be clearly understood that my invention is not limited for use in connection with uniting shanks of tools with sockets as above described, but may be employed in any instance where an apertured member and an insertable member are to be coupled. From the foregoing it will be clearly understood that my invention provides a coupling device which may be produced by the practice of conventional machine shop methods and its simplicity of construction enables the manufacture thereof at a very low cost.

Having thus described my invention, what I claim as new and desire to secure by Letters Patent is:

A machine tool coupling including a shank having an aperture extending axially thereof, said aperture including a cylindrical section and a tapered section opening outwardly from one end of said cylindrical section and extending to the outer edge of the shank, said aperture being provided with a helical groove having a relatively long lead, a rotary tool member, said tool member having a bevelled portion at one end to facilitate in inserting the tool in the shank, said tool member also including a cylindrical section companion with and adapted to be received by the cylindrical section of the aperture in the shank and a conical section adapted to be received by the companion tapered section of said aperture, the taper of said last named sections being sufficiently gradual to effect a firm binding action when the cylindrical section of said tool has been completely inserted, the cylindrical section of said tool being provided with a helical groove which is companion with the helical groove in the shank, and a detachable helical member adapted to be seated within said companion helical grooves for effecting relative longitudinal movement when the parts are relatively rotated.

In witness whereof, I have hereunto subscribed my name.

HARALD BACH.